US012784677B2

(12) United States Patent
Kim et al.

(10) Patent No.: US 12,784,677 B2
(45) Date of Patent: Nov. 3, 2026

(54) DISPLAY DEVICE, METHOD OF DRIVING THE DISPLAY DEVICE, AND ELECTRONIC DEVICE INCLUDING THE DISPLAY DEVICE

(71) Applicant: Samsung Display Co., LTD., Yongin-si (KR)

(72) Inventors: Youra Kim, Yongin-si (KR); Hyosun Kim, Yongin-si (KR); Hyungsuk Hwang, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/942,769

(22) Filed: Nov. 10, 2024

(65) Prior Publication Data

US 2025/0157403 A1 May 15, 2025

(30) Foreign Application Priority Data

Nov. 10, 2023 (KR) ........................ 10-2023-0155686

(51) Int. Cl.
*G09G 3/3233* (2016.01)

(52) U.S. Cl.
CPC ... *G09G 3/3233* (2013.01); *G09G 2300/0861* (2013.01); *G09G 2310/08* (2013.01); *G09G 2320/0247* (2013.01); *G09G 2340/0435* (2013.01)

(58) Field of Classification Search
None
See application file for complete search history.

(56) References Cited

U.S. PATENT DOCUMENTS

2023/0075226 A1* 3/2023 Lee ...................... G09G 3/2096
2023/0206824 A1* 6/2023 Go ...................... G09G 3/2077
345/691
2024/0038137 A1 2/2024 Kim et al.

FOREIGN PATENT DOCUMENTS

KR 1020200029101 A 3/2020
KR 1020200049677 A 5/2020
KR 1020210109698 A 9/2021
KR 1020220043995 A 4/2022

* cited by examiner

*Primary Examiner* — Aneeta Yodichkas
(74) *Attorney, Agent, or Firm* — CANTOR COLBURN LLP

(57) ABSTRACT

A display device includes: a display panel including pixels; and a display panel driver which drives the display panel. When a driving frequency of the display panel is changed from a first driving frequency to a second driving frequency which is different from the first driving frequency, the display panel driver determines a non-emission time of a first frame period of the second driving frequency based on a non-emission time of a frame period of the first driving frequency.

19 Claims, 10 Drawing Sheets

DISPLAY DEVICE, METHOD OF DRIVING THE DISPLAY DEVICE, AND ELECTRONIC DEVICE INCLUDING THE DISPLAY DEVICE

This application claims priority to Korean Patent Application No. 10-2023-0155686, filed on Nov. 10, 2023, and all the benefits accruing therefrom under 35 U.S.C. § 119, the content of which in its entirety is herein incorporated by reference.

BACKGROUND

1. Field

Embodiments of the invention relate to a display device and a method of driving the display device. More particularly, embodiments of the invention relate to a display device, a method of driving the display device, and an electronic device including the display device for improving a display quality in a variable frequency driving.

2. Description of the Related Art

Generally, a display device may include a display panel and a display panel driver. The display panel may include gate lines, data lines, emission lines, and pixels. The display panel driver may include a gate driver for providing gate signals to the gate lines, a data driver for providing a data voltage to the data lines, an emission driver for providing emission signals to the emission lines, and a driving controller for controlling the gate driver, the data driver, and the emission driver. Such a display device may be driven at a variable frequency.

SUMMARY

In a display device driven at a variable frequency, when a driving frequency of a display panel changes from a first driving frequency to a second driving frequency different from the first driving frequency, a hysteresis characteristics of a driving transistor included in a pixel may change, and a luminance difference of the display panel may occur. The luminance difference of the display panel may be visible as a flicker. When an average luminance of a first frame section of the second driving frequency is equal to an average luminance of a frame period of the first driving frequency, the flicker may be improved.

However, even though the average luminance of the first frame period of the second driving frequency is equal to the average luminance of the frame period of the first driving frequency, a temporary flashing may be visible and a display quality may be reduced.

Embodiments of the invention provide a display device for improving a transient flashing when a driving frequency of a display panel changes from a first driving frequency to a second driving frequency.

Embodiments of the invention provide an electronic device for improving a transient flashing when a driving frequency of a display panel changes from a first driving frequency to a second driving frequency.

Embodiments of the invention provide a method of driving the display device.

In an embodiment of a display device according to the invention, the display device comprises a display panel including pixels, and a display panel driver which drives the display panel. In such an embodiment, when a driving frequency of the display panel is changed from a first driving frequency to a second driving frequency which is different from the first driving frequency, the display panel driver determines a non-emission time of a first frame period of the second driving frequency based on a non-emission time of a frame period of the first driving frequency.

In an embodiment, an emission duty ratio of the first frame period of the second driving frequency may be determined based on the non-emission time of the first frame period of the second driving frequency.

In an embodiment, the non-emission time of the first frame period of the second driving frequency may be equal to the non-emission time of the frame period of the first driving frequency.

In an embodiment, when the second driving frequency is less than the first driving frequency, an emission duty ratio of the first frame period of the second driving frequency may be greater than an emission duty ratio of the frame period of the first driving frequency.

In an embodiment, when the second driving frequency is greater than the first driving frequency, an emission duty ratio of the first frame period of the second driving frequency may be less than an emission duty ratio of the frame period of the first driving frequency.

In an embodiment, an average luminance of the first frame period of the second driving frequency may be equal to an average luminance of the frame period of the first driving frequency.

In an embodiment, when the second driving frequency is less than the first driving frequency, a peak luminance of the first frame period of the second driving frequency may be less than a peak luminance of the frame period of the first driving frequency.

In an embodiment, when the second driving frequency is greater than the first driving frequency, a peak luminance of the first frame period of the second driving frequency may be greater than a peak luminance of the frame period of the first driving frequency.

In an embodiment, an emission duty ratio of a frame period of the second driving frequency may be changed from an emission duty ratio of the first frame period of the second driving frequency to a target emission duty ratio of the frame period of the second driving frequency during a plurality of frame periods of the second driving frequency.

In an embodiment, the emission duty ratio of the frame period of the second driving frequency may be gradually changed during the plurality of frame periods of the second driving frequency.

In an embodiment, the target emission duty ratio of the frame period of the second driving frequency may be equal to an emission duty ratio of the frame period of the first driving frequency.

In an embodiment, when the second driving frequency is less than the first driving frequency, the emission duty ratio of the frame period of the second driving frequency may be gradually decreased during the plurality of frame periods of the second driving frequency.

In an embodiment, when the second driving frequency is greater than the first driving frequency, the emission duty ratio of the frame period of the second driving frequency may be gradually increased during the plurality of frame periods of the second driving frequency.

In an embodiment, the emission duty ratio of the frame period of the second driving frequency may be gradually changed during the plurality of frame periods of the second driving frequency, and an average luminance of the frame period of the second driving frequency may be constant during the plurality of frame periods of the second driving frequency.

In an embodiment of a method of driving the display device according to the invention, the method includes changing a driving frequency of a display panel from a first driving frequency to a second driving frequency which is different from the first driving frequency, and determining a non-emission time of a first frame period of the second driving frequency based on a non-emission time of a frame period of the first driving frequency.

In an embodiment, an emission duty ratio of the first frame period of the second driving frequency may be determined based on the determined non-emission time of the first frame period of the second driving frequency.

In an embodiment, the non-emission time of the first frame period of the second driving frequency may be equal to the non-emission time of the frame period of the first driving frequency.

In an embodiment, when the second driving frequency is less than the first driving frequency, an emission duty ratio of the first frame period of the second driving frequency may be greater than an emission duty ratio of the frame period of the first driving frequency.

In an embodiment, when the second driving frequency is greater than the first driving frequency, an emission duty ratio of the first frame period of the second driving frequency may be less than an emission duty ratio of the frame period of the first driving frequency.

In an embodiment, an average luminance of the first frame period of the second driving frequency may be equal to an average luminance of the frame period of the first driving frequency.

In an embodiment of an electronic device according to the invention, the electronic device comprises a display panel including pixels, a display panel driver which drives the display panel, and a processor which controls the display panel driver. In such an embodiment, when a driving frequency of the display panel is changed from a first driving frequency to a second driving frequency which is different from the first driving frequency, the display panel driver determines a non-emission time of a first frame period of the second driving frequency based on a non-emission time of a frame period of the first driving frequency.

According to embodiments of the display device, the method of driving the display device, and the electronic device, the non-emission time of the first frame period of the second driving frequency may be determined based on the non-emission time of the frame period of the first driving frequency, such that a transient flashing may be improved.

In such embodiments, the average luminance of the first frame period of the second driving frequency may be equal to the average luminance of the frame period of the first driving frequency, such that a flicker may be improved.

In such embodiments, the emission duty ratio of the frame period of the second driving frequency may be changed from the emission duty ratio of the first frame period of the second driving frequency to the target emission duty ratio of the frame period of the second driving frequency during frame periods of the second driving frequency, such that a motion blur may be improved.

In such embodiments, the emission duty ratio of the frame period of the second driving frequency may be gradually changed during frame periods of the second driving frequency and the average luminance of the frame period of the second driving frequency may be constant during frame periods of the second driving frequency, such that a change in luminance of the display panel may be minimized.

BRIEF DESCRIPTION OF THE DRAWINGS

The above and other features of embodiments of the invention will become more apparent by describing in detailed embodiments thereof with reference to the accompanying drawings, in which.

DETAILED DESCRIPTION

Figure 1:
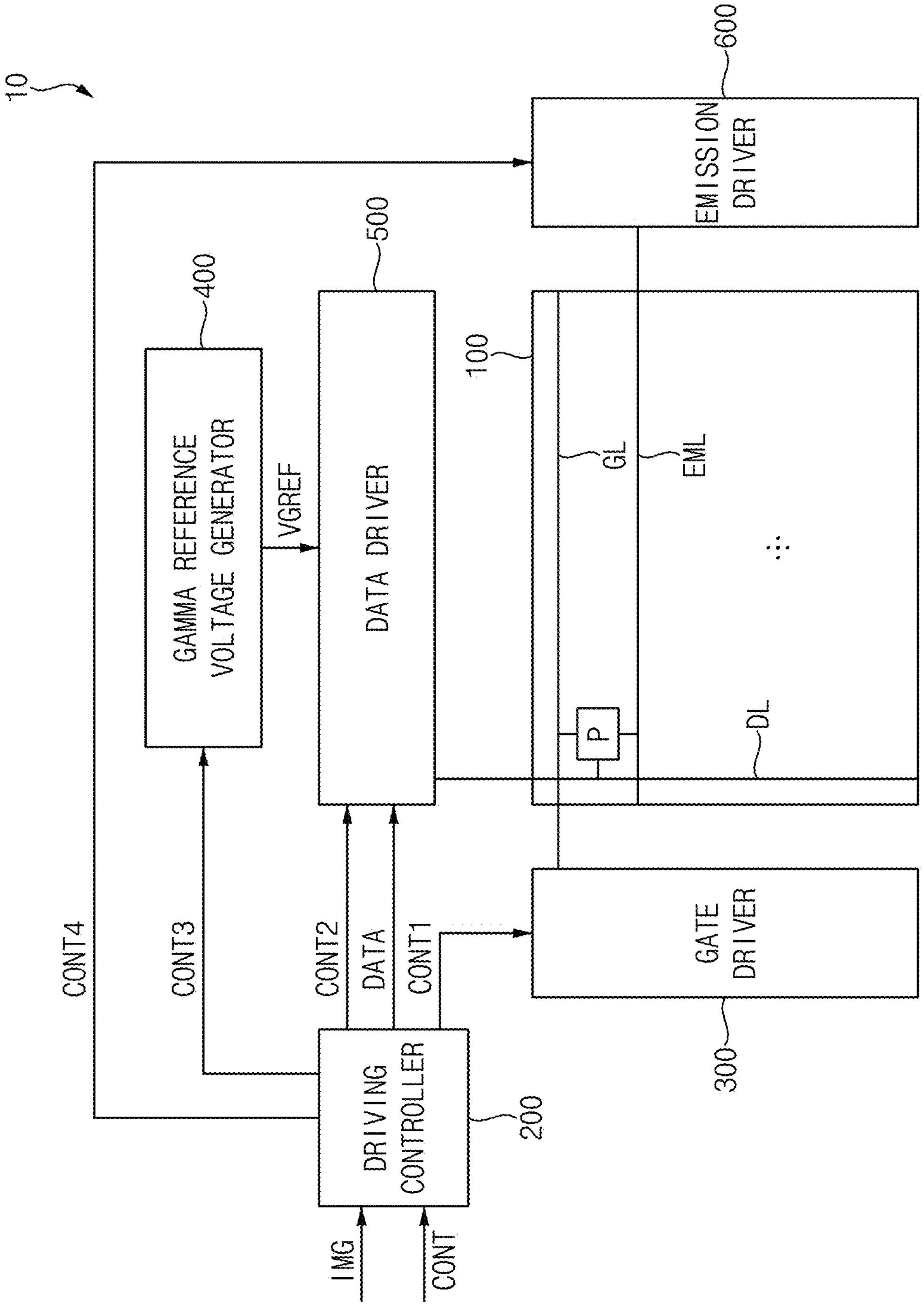
FIG. 1 is a block diagram for describing a display device according to embodiments of the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. Thus, reference to "an" element in a claim followed by reference to "the" element is inclusive of one element and a plurality of the elements. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinafter, embodiments of the invention will be described in greater detail with reference to the accompanying drawings.

FIG. 1 is a block diagram for describing a display device 10 according to embodiments of the invention.

Referring to FIG. 1, an embodiment of a display device 10 may include a display panel 100 and a display panel driver. The display panel driver may include a driving controller 200, a gate driver 300, a gamma reference voltage generator 400, a data driver 500, and an emission driver 600.

In an embodiment, for example, the driving controller 200 and the data driver 500 may be formed integrally with each other as a single module or chip. In an embodiment, for example, the driving controller 200, the gamma reference voltage generator 400, and the data driver 500 may be formed integrally with each other as a single module or chip. In an embodiment, for example, the driving controller 200, the gate driver 300, the gamma reference voltage generator 400, and the data driver 500 may be formed integrally with each other as a single module or chip. In an embodiment, for example, the driving controller 200, the gate driver 300, the gamma reference voltage generator 400, the data driver 500, and the emission driver 600 may be formed integrally with each other as a single module or chip. In an embodiment, a driving module in which at least the driving controller 200 and the data driver 500 are formed integrally may be called as a timing controller embedded data driver (TED).

The display panel 100 may include a display area for displaying an image and a peripheral area disposed adjacent to the display area.

In an embodiment, for example, the display panel 100 may be an organic light emitting diode display panel including an organic light emitting diode. In another embodiment, for example, the display panel 100 may be a quantum-dot organic light-emitting diode display panel including an organic light emitting diode and a quantum-dot color filter. In another embodiment, for example, the display panel 100 may be a quantum-dot nano light-emitting diode display panel including a nano light emitting diode and a quantum-dot color filter. In another embodiment, for example, the display panel 100 may be a liquid crystal display panel including a liquid crystal layer.

The display panel 100 may include gate lines GL, data lines DL, emission lines EML, pixels P electrically connected to the gate lines GL, the data lines DL, and the emission lines EML, respectively. The gate lines GL may extend in a first direction, the data lines DL may extend in a second direction crossing the first direction, and the emission lines EML may extend in the first direction.

The driving controller 200 may receive input image data IMG and an input control signal CONT from an external device (not shown). In an embodiment, for example, the input image data IMG may include red image data, green image data and blue image data. The input image data IMG may include white image data. The input image data IMG may include magenta image data, yellow image data, and cyan image data. The input control signal CONT may include a master clock signal and a data enable signal. The input control signal CONT may further include a vertical synchronization signal and a horizontal synchronization signal.

The driving controller 200 may generate a first control signal CONT1, a second control signal CONT2, a third control signal CONT3, a fourth control signal CONT4, and a data signal DATA based on the input image data IMG and the input control signal CONT.

The driving controller 200 may generate the first control signal CONT1 for controlling an operation of the gate driver 300 based on the input control signal CONT, and output the first control signal CONT1 to the gate driver 300. The first control signal CONT1 may include a vertical start signal and a gate clock signal.

The driving controller 200 may generate the second control signal CONT2 for controlling an operation of the data driver 500 based on the input control signal CONT, and output the second control signal CONT2 to the data driver 500. The second control signal CONT2 may include a horizontal start signal and a load signal.

The driving controller 200 may generate the data signal DATA based on the input image data IMG. The driving controller 200 may output the data signal DATA to the data driver 500.

The driving controller 200 may generate the third control signal CONT3 for controlling an operation of the gamma reference voltage generator 400 based on the input control signal CONT, and output the third control signal CONT3 to the gamma reference voltage generator 400.

The driving controller 200 may generate the fourth control signal CONT4 for controlling an operation of the emission driver 600 based on the input control signal CONT, and output the fourth control signal CONT4 to the emission driver 600.

The gate driver 300 may generate gate signals for driving the gate lines GL in response to the first control signal CONT1 received from the driving controller 200. The gate driver 300 may output the gate signals to the gate lines GL.

In an embodiment, the gate driver 300 may be integrated on the peripheral area of the display panel 100.

The gamma reference voltage generator 400 may generate a gamma reference voltage VGREF in response to the third control signal CONT3 received from the driving controller 200. The gamma reference voltage generator 400 may provide the gamma reference voltage VGREF to the data driver 500. The gamma reference voltage VGREF may have a value corresponding to each data signal DATA.

In an embodiment, the gamma reference voltage generator 400 may be disposed in the driving controller 200 or may be disposed in the data driver 500.

The data driver 500 may receive the second control signal CONT2 and the data signal DATA from the driving controller 200, and receive the gamma reference voltage VGREF from the gamma reference voltage generator 400. The data driver 500 may convert the data signal DATA into a data voltage having an analog type using the gamma reference voltage VGREF. The data driver 500 may output the data voltage to the data line DL.

The emission driver 600 may generate emission signals for driving the emission lines EML in response to the fourth control signal CONT4 received from the driving controller 200. The emission driver 600 may output the emission signals to the emission lines EML.

In an embodiment, the emission driver 600 may be integrated into the peripheral area of the display panel 100. In an embodiment, the emission driver 600 may be mounted on the peripheral area of the display panel 100.

In an embodiment, as shown in FIG. 1, the gate driver 300 may be disposed on a first side of the display panel 100 and the emission driver 600 may be disposed on a second side of the display panel 100. However, the invention is not limited thereto. In an embodiment, for example, both the gate driver 300 and the emission driver 600 may be disposed on the first side of the display panel 100. In an embodiment, for example, both the gate driver 300 and the emission driver 600 may be disposed on both sides of the display panel 100. In an embodiment, for example, the gate driver 300 and the emission driver 600 may be formed integrally with each other as a single module or chip.

Figure 2:
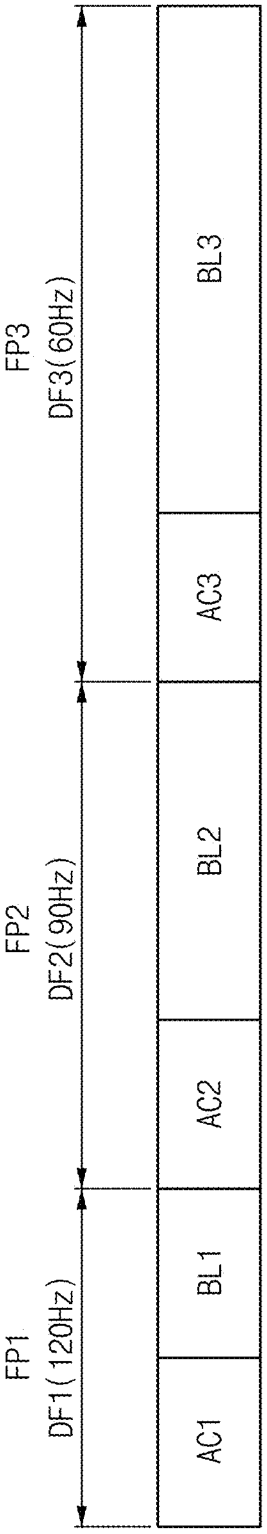
FIG. 2 is a conceptual diagram for describing a driving frequency of a display panel of FIG. 1.

FIG. 2 is a conceptual diagram for describing a driving frequency of a display panel 100 of FIG. 1.

Referring to FIG. 2, the display panel 100 may be driven at a variable frequency. A first frame period FP1 having a first driving frequency DF1 may include a first active period AC1 and a first blank period BL1. A second frame period FP2 having a second driving frequency DF2 that is different from the first driving frequency DF1 may include a second active period AC2 and a second blank period BL2. A third frame period FP3 having a third driving frequency DF3 that is different from the first driving frequency DF1 and the second driving frequency DF2 may include a third active period AC3 and a third blank period BL3.

In an embodiment, for example, as shown in FIG. 2, the first frame period FP1 may have a driving frequency of 120 hertz (Hz), the second frame period FP2 may have a driving frequency of 90 Hz, and the third frame period FP3 may have a driving frequency of 60 Hz.

The first active period AC1 may have a same length as the second active period AC2, and the first blank period BL1 may have a length that is different from a length of the second blank period BL2. In other words, a frame period of the second driving frequency DF2 may be different from a frame period of the first driving frequency DF1.

The second active period AC2 may have a same length as the third active period AC3, and the second blank period BL2 may have a length that is different from a length of the third blank period BL3. In other words, a frame period of the third driving frequency DF3 may be different from the frame period of the second driving frequency DF2.

Figure 3:
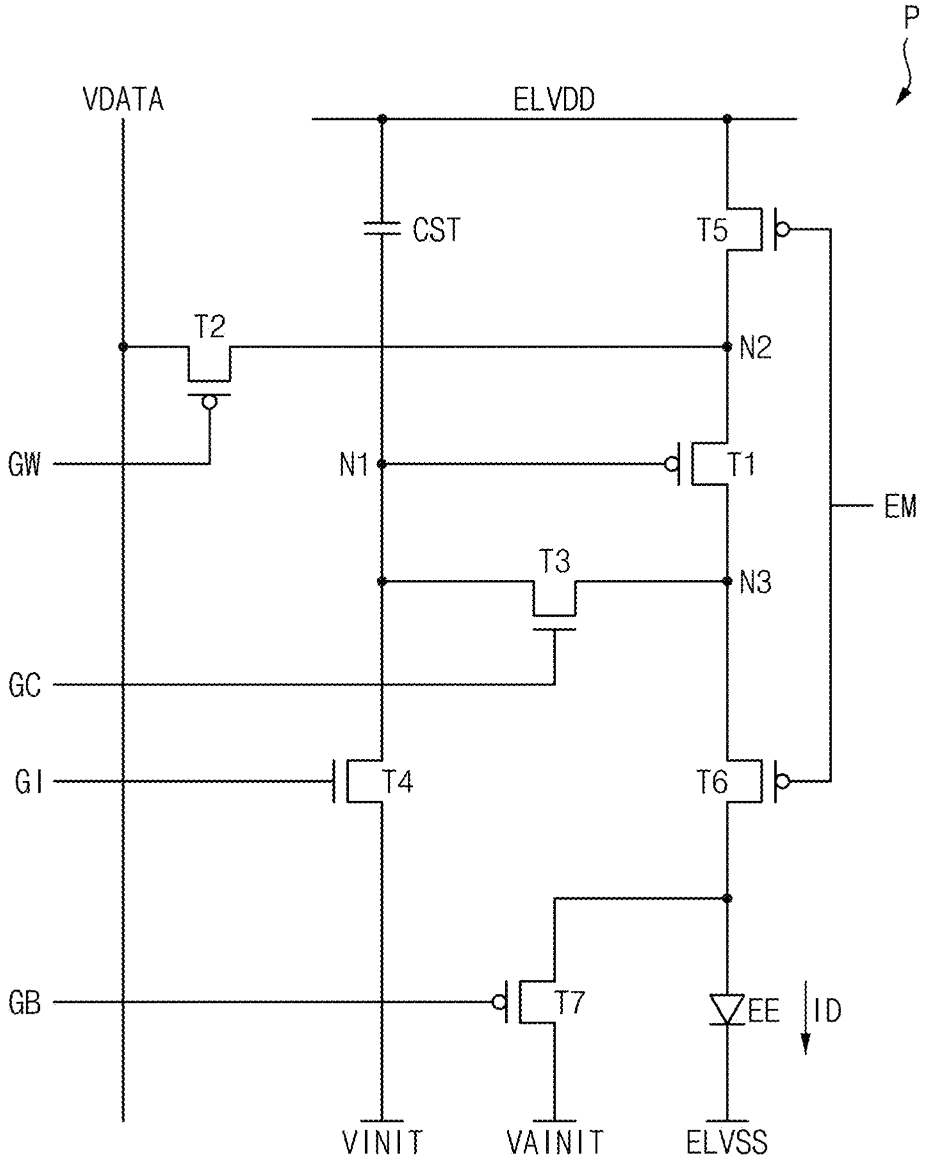
FIG. 3 is a circuit diagram showing an embodiment of a pixel included in the display device of FIG. 1.

FIG. 3 is a circuit diagram showing an embodiment of a pixel P included in the display device 10 of FIG. 1.

Referring to FIG. 3, an embodiment of the pixel P may include first to seventh transistors T1 to T7 and a light emitting element EE.

The first transistor T1 (i.e., a driving transistor) may include a gate electrode connected to a first node N1, a first electrode connected to a second node N2, and a second electrode connected to a third node N3.

The second transistor T2 may include a gate electrode to which a data write gate signal GW is applied, a first electrode to which a data voltage VDATA is applied, and a second electrode connected to the second node N2. The data voltage VDATA may be applied to the pixel P based on the data write gate signal GW.

The third transistor T3 may include a gate electrode to which a compensation gate signal GC is applied, a first electrode connected to the third node N3, and a second electrode connected to the first node N1. A threshold voltage of the first transistor T1 may be compensated for based on the compensation gate signal GC.

The fourth transistor T4 may include a gate electrode to which a data initialization gate signal GI is applied, a first electrode to which a data initialization voltage VINIT is applied, and a second electrode connected to the first node N1. The gate electrode of the first transistor T1 may be initialized to the initialization voltage VINIT based on the data initialization gate signal GI.

The fifth transistor T5 may include a gate electrode to which an emission signal EM is applied, a first electrode to which a first driving voltage ELVDD is applied, and a second electrode connected to the second node N2.

The sixth transistor T6 may include a gate electrode to which the emission signal EM is applied, a first electrode connected to the third node N3, and a second electrode connected to an anode electrode of the light emitting element EE.

The seventh transistor T7 may include a gate electrode to which an anode initialization gate signal GB is applied, a first electrode to which an anode initialization voltage VAINIT is applied, and a second electrode connected to the anode electrode of the light emitting element EE. The anode electrode of the light emitting element EE may be initialized to the anode initialization voltage VAINIT based on the anode initialization gate signal GB.

The light emitting element EE may include the anode electrode, and a cathode electrode to which a second driving voltage ELVSS is applied. The second driving voltage ELVSS may be lower than the first driving voltage ELVDD.

The pixel P may further include a storage capacitor CST including a first electrode to which the first driving voltage ELVDD is applied, and a second electrode connected to the first node N1. The storage capacitor CST may store a voltage corresponding to the data voltage VDATA.

The first transistor T1 may generate a driving current ID. The driving current ID may flow in an order of the fifth transistor T5, the first transistor T1, the sixth transistor T6, and the light emitting element EE. The light emitting element EE may emit a light based on the driving current ID. A luminance of the light emitting element EE may be determined by an intensity of the driving current ID, and the intensity of the driving current ID may be determined by a level of the data voltage VDATA.

In a case where all the transistors included in the pixel P are P-type transistors, flicker may be caused by leakage currents of the transistors during low-frequency driving. Therefore, in an embodiment, some of the transistors included in the pixel P may be N-type transistors. In an embodiment, for example, the third transistor T3 and the fourth transistor T4 may be the N-type transistors, and the first transistor T1, the second transistor T2, the fifth transistor T5, the sixth transistor T6, and the seventh transistor T7 may be the P-type transistors.

Although an embodiment where the pixel P includes the first to seventh transistors T1 to T7 and the light emitting element EE is shown in FIG. 1 for convenience of description, the disclosure is not limited thereto.

Figure 4:
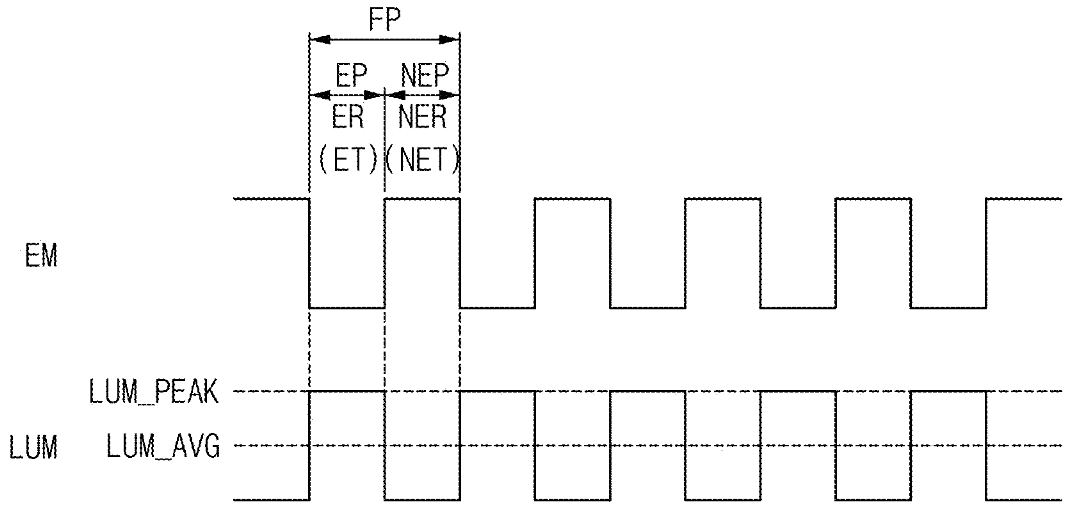
FIG. 4 is a view for describing a luminance of the display panel according to an emission signal.
Figure 5:
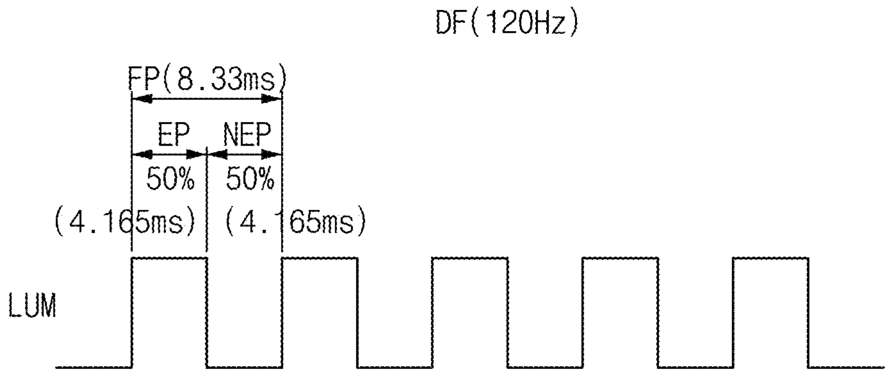
FIG. 5 is a timing diagram for describing frame periods at a driving frequency of 120 Hz.
Figure 6:
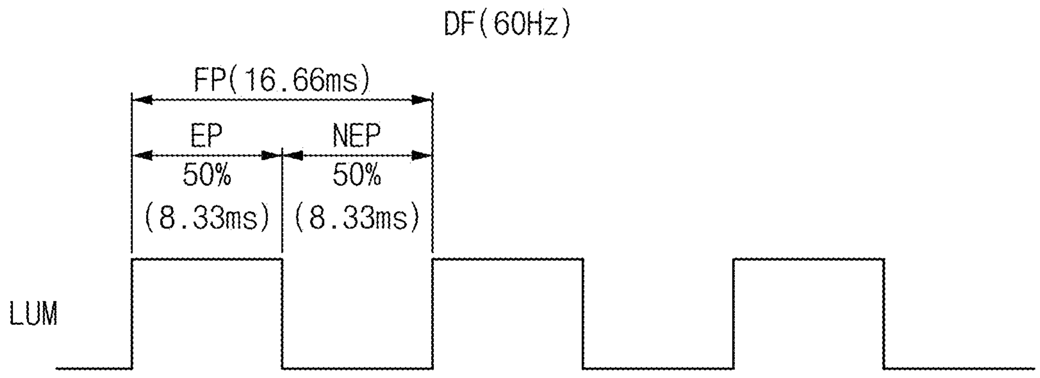
FIG. 6 is a timing diagram for describing frame periods at a driving frequency of 60 Hz.

FIG. 4 is a view for describing a luminance LUM of the display panel 100 according to an emission signal EM. FIG. 5 is a timing diagram for describing frame periods FP at a driving frequency of 120 Hz. FIG. 6 is a timing diagram for describing frame periods FP at a driving frequency of 60 Hz.

Referring to FIGS. 1 to 6, in an embodiment, a frame period FP may include an emission period EP and a non-emission period NEP. The emission period EP may be a period in which the light emitting element EE emits the light based on the driving current ID, and the non-emission period NEP may be a period in which the light emitting element EE does not emit the light.

The emission period EP and the non-emission period NEP may be distinguished from each other based on the emission signal EM. In an embodiment, for example, when the emission signal EM has a low level, the driving current ID may flow to the light emitting element EE, the light emitting element EE may emit the light, and a luminance LUM of the display panel 100 may be a peak luminance LUM_PEAK. In an embodiment, for example, when the emission signal EM has a high level, the driving current ID may not flow to the light emitting element EE, the light emitting element EE may not emit the light, and the luminance LUM of the display panel 100 may be 0.

An average luminance LUM_AVG of the display panel 100 may be an average value of the luminance LUM of the display panel 100 in the frame period FP. The average luminance LUM_AVG of the display panel 100 may be determined based on a gray level of the input image data IMG. For example, when the gray level of the input image data IMG is not 0, the average luminance LUM_AVG of the display panel 100 may not be 0, and the peak luminance LUM_PEAK of the display panel 100 may be greater than the average luminance LUM_AVG of the display panel 100. For example, when the gray level of the input image data IMG is zero (0), each of the average luminance LUM_AVG of the display panel 100 and the peak luminance LUM_PEAK of the display panel 100 may be zero (0). In addition, when the gray level of the input image data IMG is constant, the average luminance LUM_AVG of the display panel 100 may be constant regardless of a driving frequency DF of the display panel 100.

The display panel 100 may be driven at various driving frequencies DF.

In an embodiment, for example, as shown in FIG. 5, the driving frequency DF of the display panel 100 may be 120 Hz. When the display panel 100 has the driving frequency DF of 120 Hz, a length of the frame period FP may be 8.33 milliseconds (ms), each of an emission duty ratio ER and a non-emission duty ratio NER may be 50%, and each of an emission time ET corresponding to the emission duty ratio ER and a non-emission time NET corresponding to the non-emission duty ratio NER may be 4.165 ms.

In an embodiment, for example, as shown in FIG. 6, the driving frequency DF of the display panel 100 may be 60 Hz. When the display panel 100 has the driving frequency DF of 60 Hz, a length of the frame period FP may be 16.66 ms, each of an emission duty ratio ER and a non-emission duty ratio NER may be 50%, and each of an emission time ET corresponding to the emission duty ratio ER and a non-emission time NET corresponding to the non-emission duty ratio NER may be 8.33 ms.

The emission duty ratio ER may be constant in the frame periods FP. When the emission duty ratio ER is constant in the frame periods FP, motion blur may be improved. Therefore, when the gray level of the input image data IMG is the same or constant, the peak luminance LUM_PEAK and the average luminance LUM_AVG of the driving frequency DF of 120 Hz may be equal to the peak luminance LUM_PEAK and the average luminance LUM_AVG of the driving frequency DF of 60 Hz, respectively.

Figure 7:
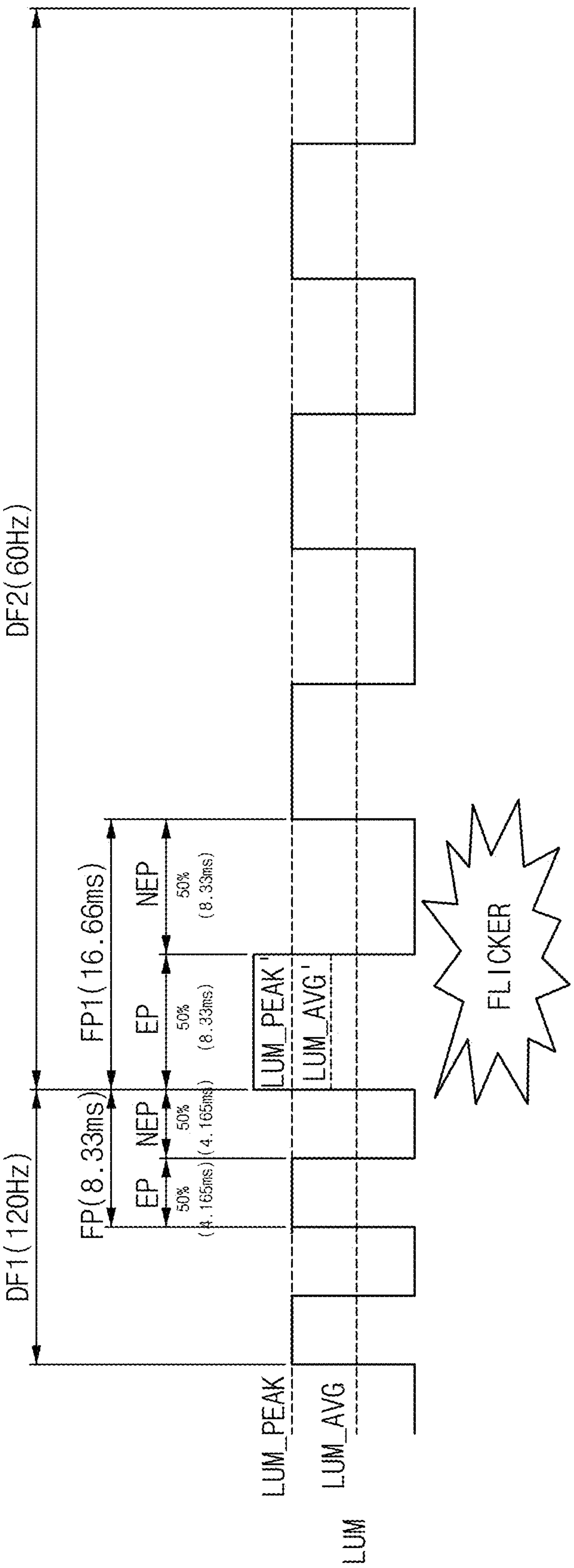
FIG. 7 is a timing diagram for describing a state in which flicker is visually recognized when a driving frequency of the display panel is changed from a first driving frequency to a second driving frequency.

FIG. 7 is a timing diagram for describing a state in which flicker is visually recognized when a driving frequency DF of the display panel 100 is changed from a first driving frequency DF1 to a second driving frequency DF2.

Referring to FIGS. 1 to 7, in an embodiment, the display panel 100 may be driven at a variable frequency. The driving frequency DF of the display panel 100 may be changed from a first driving frequency DF1 to a second driving frequency DF2 that is different from the first driving frequency DF1. For example, the first driving frequency DF1 may be 120 Hz, and the second driving frequency DF2 may be 60 Hz. Although a case in which the first driving frequency DF1 is greater than the second driving frequency DF2 is shown in FIG. 7 for convenience of description, the disclosure is not limited thereto. According to an embodiment, the first driving frequency DF1 may be less than the second driving frequency DF2.

When the driving frequency of the display panel 100 is changed from the first driving frequency DF1 to the second driving frequency DF2, a hysteresis characteristic of the driving transistor T1 may be changed. The hysteresis characteristic of the driving transistor T1 may mean the driving current ID corresponding to a gate-source voltage of the driving transistor T1. Therefore, when the hysteresis characteristic of the driving transistor T1 is changed, the luminance of the display panel 100 corresponding to the same data voltage VDATA may vary. For example, a peak luminance LUM_PEAK' of a first frame period FP1 of the second driving frequency DF2 may be greater than a peak luminance LUM_PEAK of a frame period FP of the first driving frequency DF1, and an average luminance LUM_AVG' of the first frame period FP1 of the second driving frequency DF2 may be greater than an average luminance LUM_AVG of the frame period FP of the first driving frequency DF1. A difference between the average luminance LUM_AVG' of the first frame period FP1 of the second driving frequency DF2 and the average luminance LUM_AVG of the frame period FP of the first driving frequency DF1 may be visually recognized as a flicker.

Figure 8:
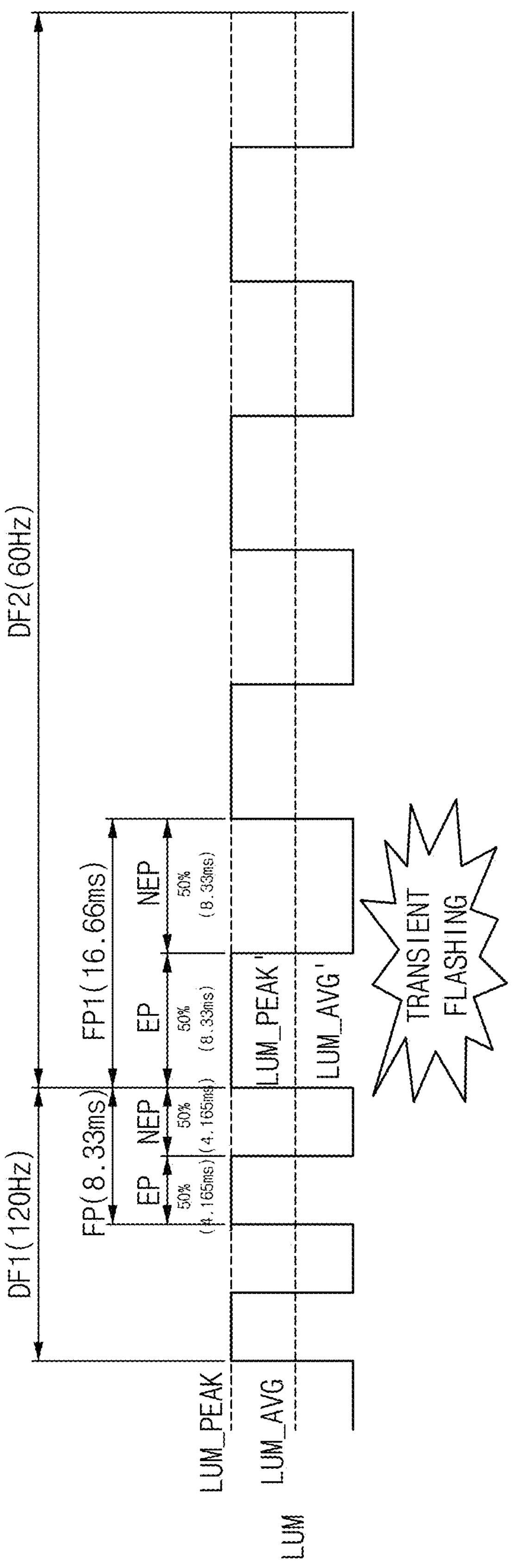
FIG. 8 is a timing diagram for describing a state in which that transient flashing is visually recognized when the driving frequency of the display panel is changed from the first driving frequency to the second driving frequency.
Figure 9:
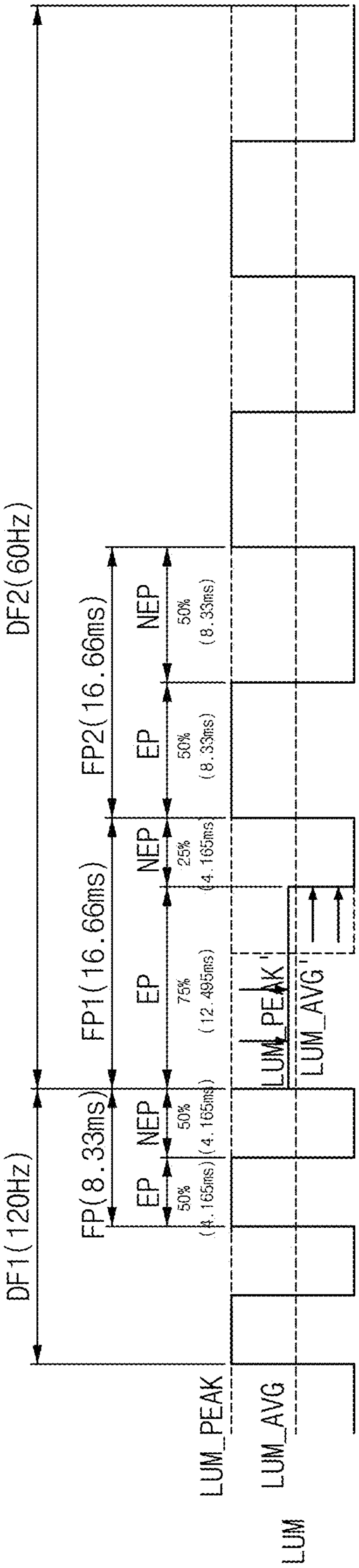
FIGS. 9 and 10 are timing diagrams for describing a non-emission time adjustment operation according to an embodiment for improving the transient flashing.
Figure 10:
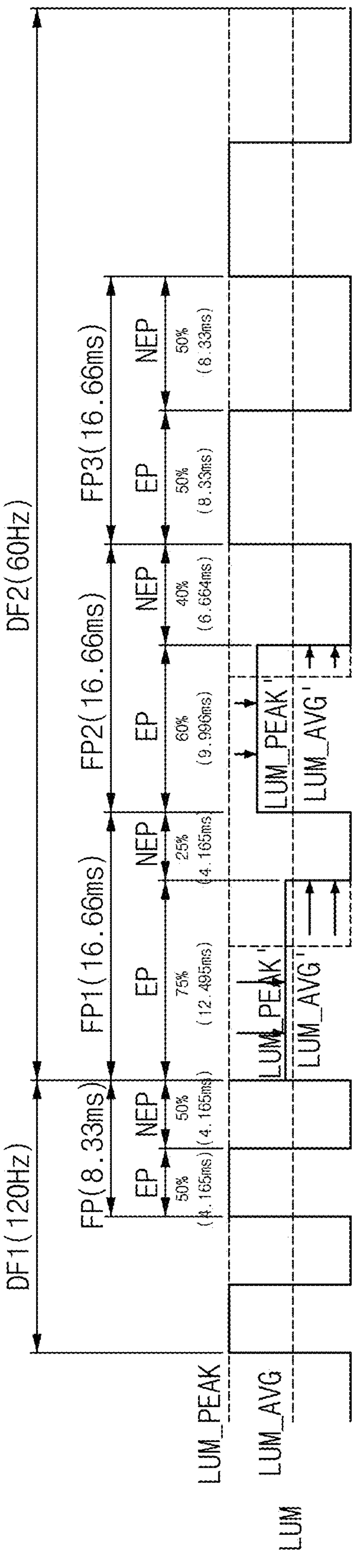

FIG. 8 is a timing diagram for describing a state in which that transient flashing is visually recognized when the driving frequency of the display panel 100 is changed from the first driving frequency DF1 to the second driving frequency DF2. FIGS. 9 and 10 are timing diagrams for describing a non-emission time adjustment operation according to an embodiment for improving the transient flashing.

Referring to FIGS. 1 to 10, when the driving frequency of the display panel 100 is changed from the first driving frequency DF1 to the second driving frequency DF2, the flicker may be visually recognized. For example, the first driving frequency DF1 may be 120 Hz, and the second driving frequency DF2 may be 60 Hz. In an embodiment, even in a case where a difference in the hysteresis characteristic of the driving transistor T1 exists, the flicker may be improved by changing the average luminance LUM_AVG' of the first frame period FP1 of the second driving frequency DF2 to the average luminance LUM_AVG of the frame period FP of the first driving frequency DF1.

In such an embodiment, although the average luminance LUM_AVG' of the first frame period FP1 of the second driving frequency DF2 is equal to the average luminance LUM_AVG of the frame period FP of the first driving frequency DF1, transient flashing may be visually recognized.

In an embodiment, when the driving frequency of the display panel 100 is change from the first driving frequency DF1 to the second driving frequency DF2, a non-emission time NET of the first frame period FP1 of the second driving frequency DF2 may be adjusted to prevent the transient flashing from being visually recognized. In such an embodiment, the non-emission time NET of the first frame period FP1 of the second driving frequency DF2 may be determined based on a non-emission time NET of the frame period FP of the first driving frequency DF1.

According to an embodiment, the non-emission time NET of the first frame period FP1 of the second driving frequency DF2 may be equal to the non-emission time NET of the frame period FP of the first driving frequency DF1. However, the disclosure is not limited thereto. The non-emission time NET of the first frame period FP1 of the second driving frequency DF2 may be determined to minimize a difference between the non-emission time NET of the first frame period FP1 of the second driving frequency DF2 and the non-emission time NET of the frame period FP of the first driving frequency DF1.

In an embodiment, for example, the non-emission time NET of the frame period FP of the first driving frequency DF1 may be 4.165 ms. In this case, the non-emission time NET of the first frame period FP1 of the second driving frequency DF2 may be determined to be 4.165 ms.

According to an embodiment, an emission duty ratio ER of the first frame period FP1 of the second driving frequency DF2 may be determined based on the determined non-emission time NET of the first frame period FP1 of the second driving frequency DF2. When the non-emission time NET of the first frame period FP1 of the second driving frequency DF2 is 4.165 ms, the emission duty ratio ER of the first frame period FP1 of the second driving frequency DF2 may be determined to be 75%, and a non-emission duty ratio NER of the first frame period FP1 of the second driving frequency DF2 may be determined to be 25%.

When the second driving frequency DF2 is less than the first driving frequency DF1, the emission duty ratio ER of the first frame period FP1 of the second driving frequency DF2 may be greater than an emission duty ratio ER of the frame period FP of the first driving frequency DF2. When the second driving frequency DF2 is greater than the first driving frequency DF1, the emission duty ratio ER of the first frame period FP1 of the second driving frequency DF2 may be less than the emission duty ratio ER of the frame period FP of the first driving frequency DF2.

In an embodiment, as described above, when the non-emission time NET of the first frame period FP1 of the second driving frequency DF2 is determined based on the non-emission time NET of the frame period FP of the first driving frequency DF1, the transient flashing may be improved.

In an embodiment, the average luminance LUM_AVG' of the first frame period FP1 of the second driving frequency DF2 may be equal to the average luminance LUM_AVG of the frame period FP of the first driving frequency DF1 to prevent the flicker from being visually recognized. When the second driving frequency DF2 is less than the first driving frequency DF1, a peak luminance LUM_PEAK' of the first frame period FP1 of the second driving frequency DF2 may be greater than a peak luminance LUM_PEAK of the frame period FP of the first driving frequency DF1. When the second driving frequency DF2 is greater than the first driving frequency DF1, the peak luminance LUM_PEAK' of the first frame period FP1 of the second driving frequency DF2 may be less than the peak luminance LUM_PEAK of the frame period FP of the first driving frequency DF1.

In an embodiment, an emission duty ratio ER of a frame period FP of the second driving frequency DF2 may be changed from an emission duty ratio ER of the first frame period FP1 of the second driving frequency DF2 to a target emission duty ratio of the frame period FP of the second driving frequency DF2 to prevent the motion blur from being visually recognized. The target emission duty ratio of the frame period FP of the second driving frequency DF2 may be equal to an emission duty ratio ER of the frame period FP of the first driving frequency DF1. In an embodiment, for example, as shown in FIG. 9, the emission duty ratio ER of the frame period FP of the second driving frequency DF2 may have an emission duty ratio ER of 75% in the first frame period FP1 of the second driving frequency DF2, and may be changed to an emission duty ratio ER of 50% in a second frame period FP2 of the second driving frequency DF2.

In an embodiment, the emission duty ratio ER of the frame period FP of the second driving frequency DF2 may be gradually changed to prevent a change in the luminance of the display panel 100 from being visually recognized in a process of changing the emission duty ratio ER of the frame period FP of the second driving frequency DF2 from the emission duty ratio ER to the target emission duty ratio of the frame period FP of the second driving frequency DF2. In an embodiment, for example, as shown in FIG. 10, the emission duty ratio ER of the frame period FP of the second driving frequency DF2 may have an emission duty ratio ER of 75% in the first frame period FP1 of the second driving frequency DF2, may be changed to an emission duty ratio ER of 60% in the second frame period FP2 of the second driving frequency DF2, and may be changed to an emission duty ratio ER of 50% in a third frame period FP3 of the second driving frequency DF2.

When the second driving frequency DF2 is less than the first driving frequency DF1, the emission duty ratio ER of the frame period FP of the second driving frequency DF2 may be gradually decreased. When the second driving frequency DF2 is greater than the first driving frequency DF1, the emission duty ratio ER of the frame period FP of the second driving frequency DF2 may be gradually increased.

When the emission duty ratio ER of the frame period FP of the second driving frequency DF2 is gradually changed, an average luminance LUM_AVG of the frame period FP of the second driving frequency DF2 may be constant. In an embodiment, for example, each of the average luminance LUM_AVG' of the first frame period FP1 of the second driving frequency DF2 and an average luminance LUM_AVG' of the second frame period FP2 of the second driving frequency DF2 may be equal to the average luminance LUM_AVG of the frame period FP of the first driving frequency DF1.

In an embodiment, as described above, the non-emission time NET of the first frame period FP1 of the second driving frequency DF2 may be determined based on the non-emission time NET of the frame period FP of the first driving frequency DF1, such that the transient flashing may be improved. In an embodiment, the average luminance LUM_AVG' of the first frame period FP1 of the second driving frequency DF2 may be equal to the average luminance LUM_AVG of the frame period FP of the first driving frequency DF1, such that the flicker may be improved. In an embodiment, the emission duty ratio ER of the frame period FP of the second driving frequency DF2 may be changed during frame periods of the second driving frequency DF2 from the emission duty ratio ER of the first frame period FP1 of the second driving frequency DF2 to the target emission duty ratio of the frame period FP of the second driving frequency DF2, such that the motion blur may be improved. In an embodiment, the emission duty ratio ER of each frame period FP of the second driving frequency DF2 may be gradually changed during frame periods of the second driving frequency DF2, and the average luminance LUM_AVG of the frame period FP of the second driving frequency DF2 may be constant during the during frame periods of the second driving frequency DF2, such that the change in the luminance of the display panel 100 may be minimized.

Figure 11:
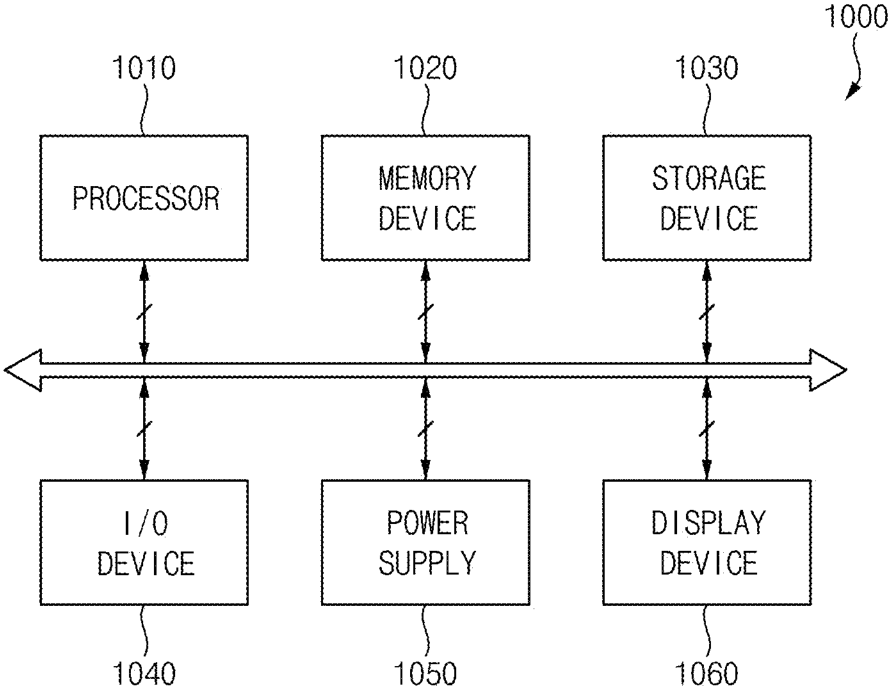
FIG. 11 is a block diagram for describing an electronic device.
Figure 12:
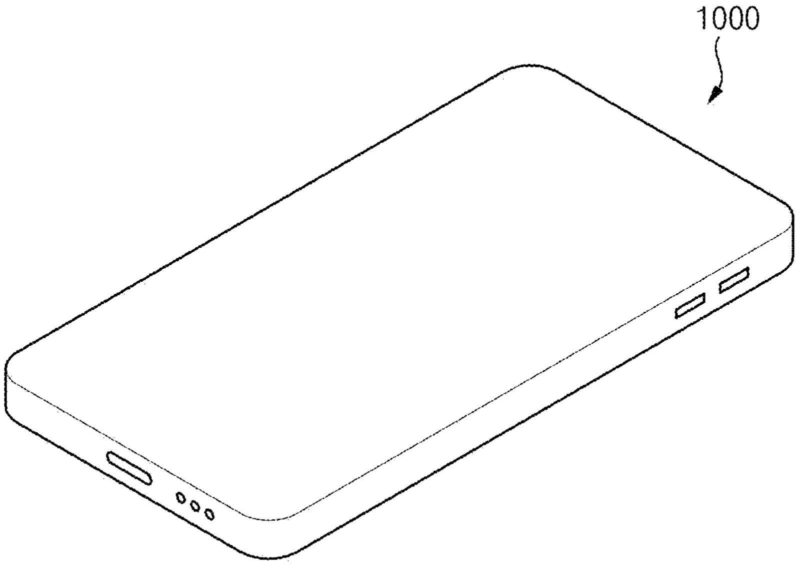
FIG. 12 is a diagram for describing an embodiment in which the electronic device of FIG. 11 is implemented as a smart phone.

FIG. 11 is a block diagram for describing an electronic device. FIG. 12 is a diagram for describing an embodiment in which the electronic device of FIG. 11 is implemented as a smart phone.

Referring to FIGS. 11 and 12, an embodiment of the electronic device 1000 may include a processor 1010, a memory device 1020, a storage device 1030, an input/output (I/O) device 1040, a power supply 1050, and a display device 1060. The display device 1060 may be the display device 10 of FIG. 1. In addition, the electronic device 1000 may further include a plurality of ports for communicating with a video card, a sound card, a memory card, a universal serial bus (USB) device, another electronic device, or the like.

In an embodiment, as illustrated in FIG. 12, the electronic device 1000 may be implemented as a smart phone. However, the electronic device 1000 is not limited thereto. For example, the electronic device 1000 may be implemented as a cellular phone, a video phone, a smart pad, a smart watch, a tablet computer, a car navigation system, a computer monitor, a laptop, a head mounted display (HMD) device, or the like.

The processor 1010 may perform various computing functions. The processor 1010 may be a micro processor, a central processing unit (CPU), an application processor (AP), or the like. The processor 1010 may be coupled to other components via an address bus, a control bus, a data bus, or the like. Further, the processor 1010 may be coupled to an extended bus such as a peripheral component interconnection (PCI) bus.

The memory device 1020 may store data for operations of the electronic device 1000. For example, the memory device 1020 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, or the like and/or at least one volatile memory device such as a dynamic random access memory (DRAM) device, a static random access memory (SRAM) device, a mobile DRAM device, or the like.

The storage device 1030 may include a solid state drive (SSD) device, a hard disk drive (HDD) device, a CD-ROM device, or the like.

The I/O device 1040 may include an input device such as a keyboard, a keypad, a mouse device, a touch-pad, a touch-screen, or the like, and an output device such as a printer, a speaker, or the like. In some embodiments, the I/O device 1040 may include the display device 1060.

The power supply 1050 may provide power for operations of the electronic device 1000.

The display device 1060 may be connected to other components through buses or other communication links.

Embodiments of the inventions may be applied to any display device and any electronic device including the touch panel, such as a mobile phone, a smart phone, a tablet computer, a digital television (TV), a three-dimensional (3D) TV, a personal computer (PC), a home appliance, a laptop computer, a personal digital assistant (PDA), a portable multimedia player (PMP), a digital camera, a music player, a portable game console, a navigation device, etc.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A display device comprising:

a display panel including pixels; and a display panel driver which drives the display panel, wherein the display panel driver provides an emission signal to the pixels to partition a length of each frame period into an emission time corresponding to an emission period and a non-emission time corresponding to a non-emission period, and when a driving frequency of the display panel is changed from a first driving frequency to a second driving frequency which is different from the first driving frequency, the display panel driver determines the non-emission time of a first frame period of the second driving frequency to correspond to the non-emission time of a frame period of the first driving frequency, and wherein the non-emission time of the first frame period of the second driving frequency is equal to the non-emission time of the frame period of the first driving frequency.

2. The display device of claim 1, wherein an emission duty ratio of the first frame period of the second driving frequency is determined based on the non-emission time of the first frame period of the second driving frequency.

3. The display device of claim 1, wherein, when the second driving frequency is less than the first driving frequency, an emission duty ratio of the first frame period of the second driving frequency is greater than an emission duty ratio of the frame period of the first driving frequency.

4. The display device of claim 1, wherein, when the second driving frequency is greater than the first driving frequency, an emission duty ratio of the first frame period of the second driving frequency is less than an emission duty ratio of the frame period of the first driving frequency.

5. The display device of claim 1, wherein an average luminance of the first frame period of the second driving frequency is equal to an average luminance of the frame period of the first driving frequency.

6. The display device of claim 5, wherein, when the second driving frequency is less than the first driving frequency, a peak luminance of the first frame period of the second driving frequency is less than a peak luminance of the frame period of the first driving frequency.

7. The display device of claim 5, wherein, when the second driving frequency is greater than the first driving frequency, a peak luminance of the first frame period of the second driving frequency is greater than a peak luminance of the frame period of the first driving frequency.

8. The display device of claim 1, wherein an emission duty ratio of a frame period of the second driving frequency is changed from an emission duty ratio of the first frame period of the second driving frequency to a target emission duty ratio of the frame period of the second driving frequency during a plurality of frame periods of the second driving frequency.

9. The display device of claim 8, wherein the emission duty ratio of the frame period of the second driving frequency is gradually changed during the plurality of frame periods of the second driving frequency.

10. The display device of claim 8, wherein the target emission duty ratio of the frame period of the second driving frequency is equal to an emission duty ratio of the frame period of the first driving frequency.

11. The display device of claim 8, wherein, when the second driving frequency is less than the first driving frequency, the emission duty ratio of the frame period of the second driving frequency is gradually decreased during the plurality of frame periods of the second driving frequency.

12. The display device of claim 8, wherein, when the second driving frequency is greater than the first driving frequency, the emission duty ratio of the frame period of the second driving frequency is gradually increased during the plurality of frame periods of the second driving frequency.

13. The display device of claim 8, wherein the emission duty ratio of the frame period of the second driving frequency is gradually changed during the plurality of frame periods of the second driving frequency, and an average luminance of the frame period of the second driving frequency is constant during the plurality of frame periods of the second driving frequency.

14. A method of driving a display device, the method comprising:

partitioning a length of each frame period into an emission time corresponding to an emission period and a non-emission time corresponding to a non-emission period by providing an emission signal to the pixels;

changing a driving frequency of a display panel from a first driving frequency to a second driving frequency which is different from the first driving frequency; and determining the non-emission time of a first frame period of the second driving frequency to correspond to the non-emission time of a frame period of the first driving frequency, wherein the non-emission time of the first frame period of the second driving frequency is equal to the non-emission time of the frame period of the first driving frequency.

15. The method of claim 14, wherein an emission duty ratio of the first frame period of the second driving frequency is determined based on the non-emission time of the first frame period of the second driving frequency.

16. The method of claim 14, wherein, when the second driving frequency is less than the first driving frequency, an emission duty ratio of the first frame period of the second driving frequency is greater than an emission duty ratio of the frame period of the first driving frequency.

17. The method of claim 14, wherein, when the second driving frequency is greater than the first driving frequency, an emission duty ratio of the first frame period of the second driving frequency is less than an emission duty ratio of the frame period of the first driving frequency.

18. The method of claim 14, wherein an average luminance of the first frame period of the second driving frequency is equal to an average luminance of the frame period of the first driving frequency.

19. An electronic device comprising:

a display panel including pixels;

a display panel driver which drives the display panel; and a processor which controls the display panel driver, wherein the display panel driver provides an emission signal to the pixels to partition a length of each frame period into an emission time corresponding to an emission period and a non-emission time corresponding to a non-emission period, and when a driving frequency of the display panel is changed from a first driving frequency to a second driving frequency which is different from the first driving frequency, the display panel driver determines the non-emission time of a first frame period of the second driving frequency to correspond to the non-emission time of a frame period of the first driving frequency, and wherein the non-emission time of the first frame period of the second driving frequency is equal to the non-emission time of the frame period of the first driving frequency.

* * * * *